(12) United States Patent
Shibuya

(10) Patent No.: US 10,908,078 B2
(45) Date of Patent: Feb. 2, 2021

(54) MONITORING METHOD, MONITORING SYSTEM, AND STRUCTURE, CONSTRUCTION, OR MOVABLE BODY

(71) Applicant: NEC CORPORATION, Tokyo (JP)

(72) Inventor: Akinobu Shibuya, Tokyo (JP)

(73) Assignee: NEC CORPORATION, Tokyo (JP)

( * ) Notice: Subject to any disclaimer, the term of this patent is extended or adjusted under 35 U.S.C. 154(b) by 56 days.

(21) Appl. No.: 16/466,483

(22) PCT Filed: Oct. 19, 2017

(86) PCT No.: PCT/JP2017/037778
§ 371 (c)(1),
(2) Date: Jun. 4, 2019

(87) PCT Pub. No.: WO2018/105242
PCT Pub. Date: Jun. 14, 2018

(65) Prior Publication Data
US 2020/0064257 A1 Feb. 27, 2020

(30) Foreign Application Priority Data

Dec. 7, 2016 (JP) .................................. 2016-237665

(51) Int. Cl.
*G01N 21/35* (2014.01)
*C04B 33/132* (2006.01)
(Continued)

(52) U.S. Cl.
CPC ........... *G01N 21/35* (2013.01); *C04B 33/132* (2013.01); *C04B 35/50* (2013.01); *C04B 38/009* (2013.01);
(Continued)

(58) Field of Classification Search
CPC ...... G01N 21/35; C04B 33/132; C04B 35/50; C04B 38/009
See application file for complete search history.

(56) References Cited

U.S. PATENT DOCUMENTS 7,867,613 B2 * 1/2011 Smith ................. C04B 38/0655
428/403
8,075,997 B2 * 12/2011 Smith ................... C04B 38/009
428/403

(Continued)

FOREIGN PATENT DOCUMENTS

| JP | 62-157555 A | 7/1987 |
| JP | 2002-267432 A | 9/2002 |

(Continued)

OTHER PUBLICATIONS

D. Burleigh et al., "The influence of optical properties of paints and coatings on the efficiency of infrared nondestructive testing applied to aluminum aircraft structures", Infrared Physics and Technology, 2016, pp. 230-238, vol. 77.

(Continued)

*Primary Examiner* — David P Porta
*Assistant Examiner* — Djura Malevic
(74) *Attorney, Agent, or Firm* — Sughrue Mion, PLLC

(57) ABSTRACT

An infrared ray radiated from a region of a surface of an object to which a coating film (20) of a coating material is provided is detected by an infrared sensor (42). The coating film (20) includes a porous ceramic particle (22) and a binder (24), and the ceramic particle (22) includes a compound represented by a compositional formula of any of $A_aR_bAl_cO_4$, $A_aR_bGa_cO_4$, $R_x Al_y O_{12}$, and $R_x Ga_y O_{12}$. Here, A is one or more elements selected from a group consisting of Ca, Sr, and Ba, and R is one or more elements selected from a group consisting of rare earth elements. Also, a is equal to or greater than 0.9 and equal to or less than 1.1, b (Continued)

is equal to or greater than 0.9 and equal to or less than 1.1, c is equal to or greater than 0.9 and equal to or less than 1.1, x is equal to or greater than 2.9 and equal to or less than 3.1, and y is equal to or greater than 4.9 and equal to or less than 5.1. A porosity of the ceramic particle (22) is equal to or greater than 20% and equal to or less than 40%.

20 Claims, 8 Drawing Sheets

(51) Int. Cl.
 *C04B 35/50* (2006.01)
 *C04B 38/00* (2006.01)
(52) U.S. Cl.
 CPC .............. *C04B 2235/3217* (2013.01); *C04B 2235/3224* (2013.01); *C04B 2235/77* (2013.01); *C04B 2235/96* (2013.01)

(56) References Cited

U.S. PATENT DOCUMENTS

| | | | | |
|---|---|---|---|---|
| 10,442,739 | B2 * | 10/2019 | Kobayashi | ............ F02F 1/4264 |
| 10,544,363 | B2 * | 1/2020 | Shibuya | ............. C09K 11/7701 |
| 2005/0038817 | A1 | 2/2005 | Huang et al. | |
| 2006/0249245 | A1 * | 11/2006 | Balling | ................... C03C 17/04 156/241 |
| 2007/0166541 | A1 * | 7/2007 | Smith | ..................... C04B 35/04 428/402 |
| 2008/0135245 | A1 * | 6/2008 | Smith | ............... C04B 35/62886 166/280.2 |
| 2011/0077176 | A1 * | 3/2011 | Smith | ..................... C04B 35/58 507/271 |
| 2017/0001919 | A1 * | 1/2017 | Kobayashi | .......... C04B 35/6264 |
| 2017/0253797 | A1 * | 9/2017 | Shibuya | .................. H02S 10/30 |
| 2017/0335155 | A1 * | 11/2017 | Czerepinski | .......... C04B 35/486 |

FOREIGN PATENT DOCUMENTS

| | | |
|---|---|---|
| JP | 2003-98134 A | 4/2003 |
| JP | 2008-224464 A | 9/2008 |
| WO | 2016/042749 A1 | 3/2016 |

OTHER PUBLICATIONS

International Search Report for PCT/JP2017/037778 dated, Jan. 23, 2018 (PCT/ISA/210).

* cited by examiner

MONITORING METHOD, MONITORING SYSTEM, AND STRUCTURE, CONSTRUCTION, OR MOVABLE BODY

CROSS REFERENCE TO RELATED APPLICATIONS

This application is a National Stage of International Application No. PCT/JP2017/037778 filed Oct. 19, 2017, claiming priority based on Japanese Patent Application No. 2016-237665, filed Dec. 7, 2016, the content of which are incorporated herein in their entirety.

TECHNICAL FIELD

The present invention relates to a monitoring method, a monitoring system, and a structure, a construction, or a movable body.

BACKGROUND ART

Deterioration of structures such as wall surfaces and road surfaces should be discovered as early as possible, and it is required to perform necessary maintenance. In order to do that, it is important that the structure can be easily monitored.

Patent Document 1 describes that a concrete covering a surface of a tunnel is cleaned, thermally dried, and then photographed with an infrared ray camera to detect damage of the covering surface.

RELATED DOCUMENT

Patent Document

[Patent Document 1] Japanese Unexamined Patent Publication No. 2002-267432

SUMMARY OF THE INVENTION

Technical Problem

Unfortunately, in a technique of Patent Document 1, deterioration of structure or the like could not be easily detected. For example, in a method of Patent Document 1, since washing or thermal drying of a surface to be inspected is needed, it took time and labor.

The present invention has been made in view of the problems. An object of the present invention is to easily detect deterioration of a structure or the like.

Solution to Problem

A monitoring method according to the present invention includes: detecting, by an infrared sensor, an infrared ray radiated from a region of a surface of an object to which a coating film of a coating material is provided, in which the coating film includes a porous ceramic particle and a binder, the ceramic particle includes a compound represented by a compositional formula of any of $A_aR_bAl_cO_4$, $A_aR_bGa_cO_4$, $R_xAl_yO_{12}$, and $R_xGa_yO_{12}$, where A is one or more elements selected from a group consisting of Ca, Sr, and Ba, R is one or more elements selected from a group consisting of rare earth elements, a is equal to or greater than 0.9 and equal to or less than 1.1, b is equal to or greater than 0.9 and equal to or less than 1.1, c is equal to or greater than 0.9 and equal to or less than 1.1, x is equal to or greater than 2.9 and equal to or less than 3.1, and y is equal to or greater than 4.9 and equal to or less than 5.1, and a porosity of the ceramic particle is equal to or greater than 20% and equal to or less than 40%.

A monitoring system according to the present invention includes: an infrared sensor that detects an infrared ray radiated from a region of a surface of an object to which a coating film of a coating material is provided, in which the coating film includes a porous ceramic particle and a binder, the ceramic particle includes a compound represented by a compositional formula of any of $A_aR_bAl_cO_4$, $A_aR_bGa_cO_4$, $R_xAl_yO_{12}$, and $R_xGa_yO_{12}$, where A is one or more elements selected from a group consisting of Ca, Sr, and Ba, R is one or more elements selected from a group consisting of rare earth elements, a is equal to or greater than 0.9 and equal to or less than 1.1, b is equal to or greater than 0.9 and equal to or less than 1.1, c is equal to or greater than 0.9 and equal to or less than 1.1, x is equal to or greater than 2.9 and equal to or less than 3.1, and y is equal to or greater than 4.9 and equal to or less than 5.1, and a porosity of the ceramic particle is equal to or greater than 20% and equal to or less than 40%.

A structure, a construction, or a movable body according to the present invention includes: a coating film of a coating material on at least a part of a surface, in which the coating film includes a porous ceramic particle and a binder, the ceramic particle includes a compound represented by a compositional formula of any of $A_aR_bAl_cO_4$, $A_aR_bGa_cO_4$, $R_xAl_yO_{12}$, and $R_xGa_yO_{12}$, where A is one or more elements selected from a group consisting of Ca, Sr, and Ba, R is one or more elements selected from a group consisting of rare earth elements, a is equal to or greater than 0.9 and equal to or less than 1.1, b is equal to or greater than 0.9 and equal to or less than 1.1, c is equal to or greater than 0.9 and equal to or less than 1.1, x is equal to or greater than 2.9 and equal to or less than 3.1, and y is equal to or greater than 4.9 and equal to or less than 5.1, and a porosity of the ceramic particle is equal to or greater than 20% and equal to or less than 40%.

Advantageous Effects of Invention

According to the present invention, it is possible to easily detect deterioration of a structure or the like.

BRIEF DESCRIPTION OF THE DRAWINGS

The objects described above, other objects, features, and advantages will become more apparent from the description of the following preferred example embodiments and accompanying drawings.

EXAMPLE EMBODIMENT

Figure 1:
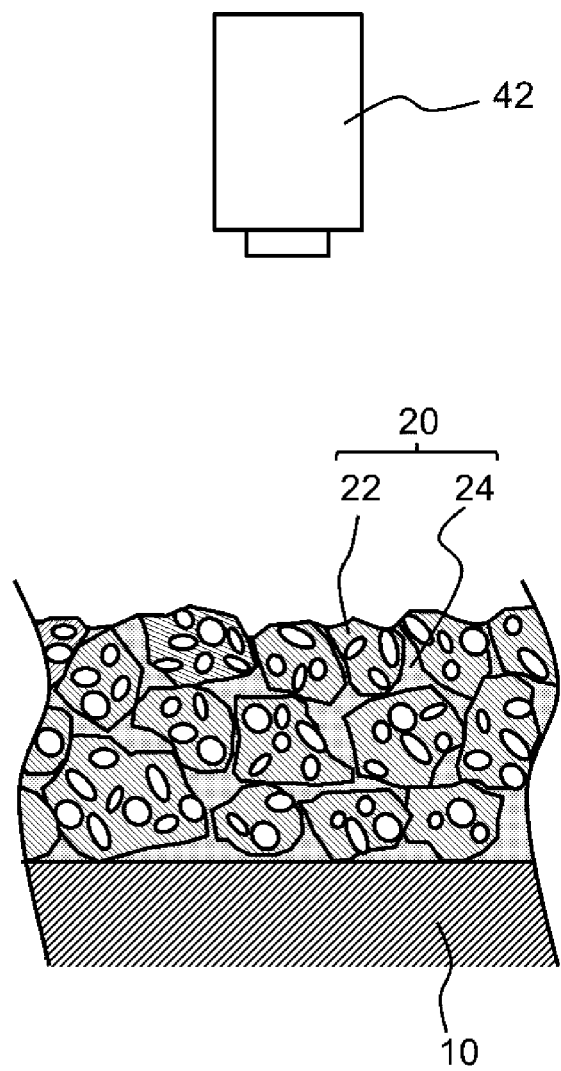
FIG. 1 is a diagram illustrating a monitoring method according to an example embodiment.
Figure 2A:
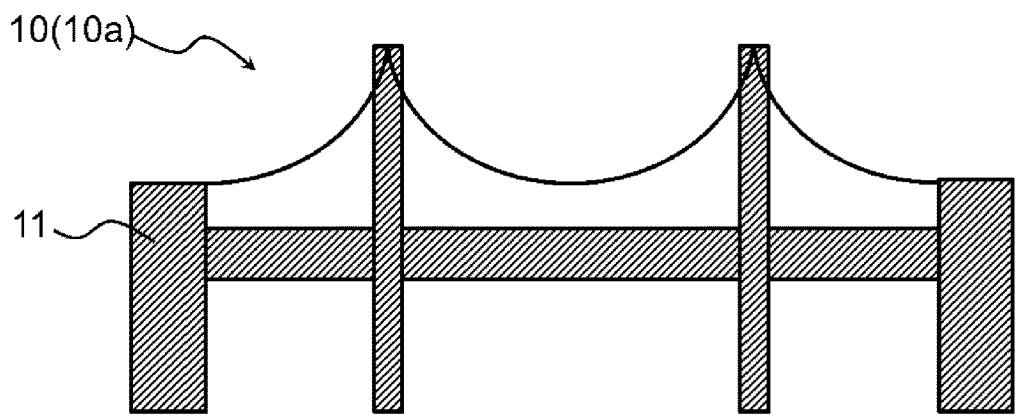
FIGS. 2A and 2B are diagrams showing examples of an object.
Figure 2B:
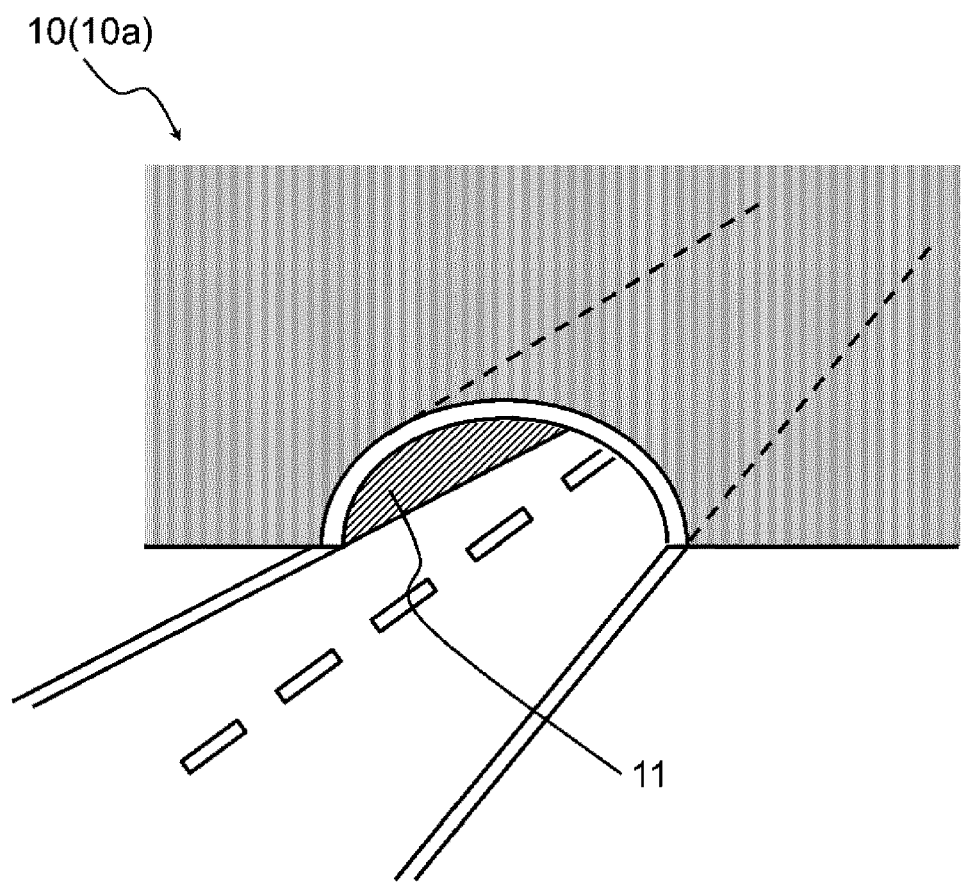
Figure 3A:
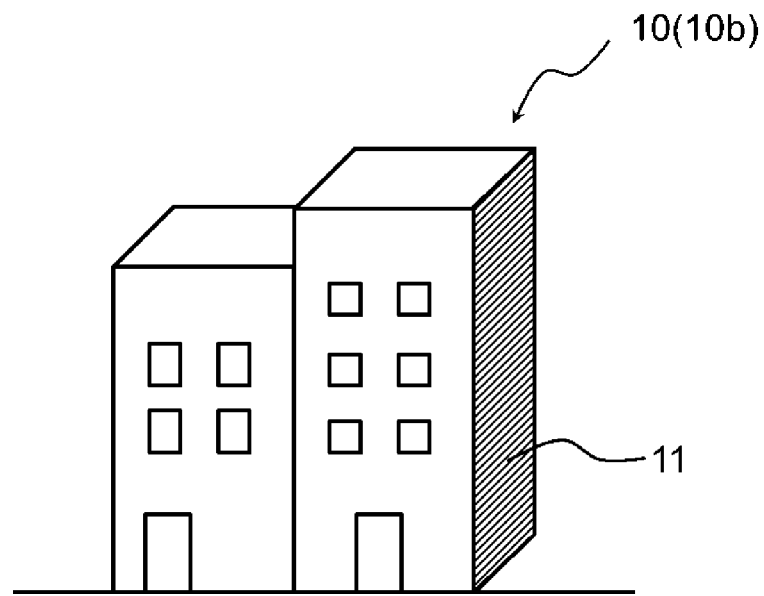
FIGS. 3A and 3B are diagrams showing other examples of the objects.
Figure 3B:
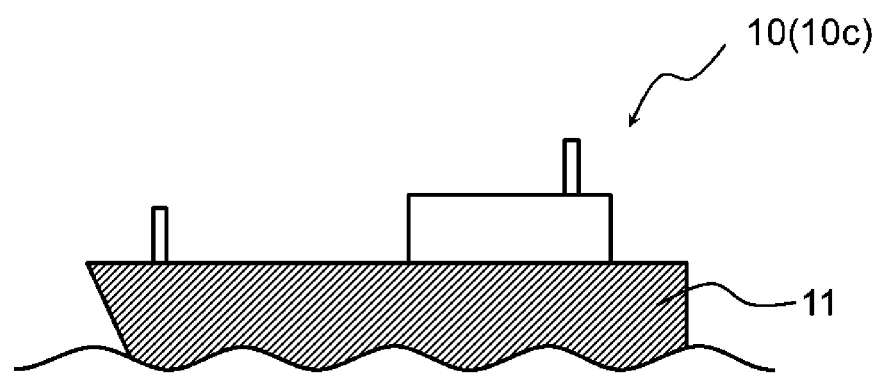

Hereinafter, example embodiments of the present invention will be described using drawings. Note that, in all the drawings, similar components are denoted by the same reference numerals, and a description thereof will not be repeated.

In the following description, a detection unit 44 of a monitoring system 40 shows not a hardware unit configuration but a functional unit block. The detection unit 44 of the monitoring system 40 is realized by a CPU of a certain computer, memory, a program that is loaded in the memory and realizes constituent elements of the drawings, a storage medium such as a hard disk that stores the program, and a certain combination of hardware and software, centrally using an interface for network connection. There are various modification examples to a realization method or apparatus.

Example Embodiment

FIG. 1 is a diagram illustrating a monitoring method according to the present example embodiment. In the present method, an infrared ray radiated from a region of a surface of an object to which a coating film 20 of a coating material is provided is detected by an infrared sensor 42. The coating film 20 includes a porous ceramic particle 22 and a binder 24, and the ceramic particle 22 includes a compound represented by a compositional formula of any of $A_aR_bAl_cO_4$, $A_aR_bGa_cO_4$, $R_xAl_yO_{12}$, and $R_xGa_yO_{12}$. Here, A is one or more elements selected from a group consisting of Ca, Sr, and Ba, and R is one or more elements selected from a group consisting of rare earth elements. Also, a is equal to or greater than 0.9 and equal to or less than 1.1, b is equal to or greater than 0.9 and equal to or less than 1.1, c is equal to or greater than 0.9 and equal to or less than 1.1, x is equal to or greater than 2.9 and equal to or less than 3.1, and y is equal to or greater than 4.9 and equal to or less than 5.1. A porosity of the ceramic particle 22 is equal to or greater than 20% and equal to or less than 40%. Hereinafter, a description will be given in detail.

FIGS. 2A, 2B, 3A, and 3B are diagrams showing examples of an object 10. An object 10 is, for example, a structure 10a, a construction 10b, or a movable body 10c. Examples of the structure 10a include a bridge, a tunnel, a road surface, iron column, a steel tower, a levee, a wall, a platform, and an amusement facility. Examples of the construction 10b include a building, a house, a warehouse, and other facilities. Examples of the movable body 10c include a ship, a vehicle, and an aircraft. Examples of a material forming the surface of the object 10 include, but not limited to, concrete, porcelain, plastic, stone, metal, and wood. The object 10 is the bridge in an example of FIG. 2A, the tunnel in an example of FIG. 2B, the building in an example of FIG. 3A, and the ship in an example of FIG. 3B. In each example, for example, a face 11 of the object 10 can be set as a monitoring object.

The infrared sensor 42 is, for example, a sensor with a photodiode or an infrared ray camera. The ceramic particle 22 included in the coating material according to the present example embodiment has a characteristic that emissivity or transmittance of light at a specific wavelength of an infrared band is small. Therefore, infrared intensity detected by the infrared sensor 42 is small on the surface of the coating film 20. On the other hand, in a case where a defect such as breaking, a crack, peeling, and sticking is generated in the coating film 20, the infrared ray is radiated from a gap of the coating film 20. In a detection result of the infrared sensor 42, a contrast between a region where the coating film 20 is formed and a region where a crack and the like are generated appears strongly. Therefore, a fine crack and the like can be easily discovered.

In addition, in the method according to the present example embodiment, it is not necessary to install a vibration sensor or a distortion sensor for detection of deterioration, and it is also not necessary to secure a power source or replace a battery. The surface on which the coating film 20 has been formed in advance may be inspected at a predetermined timing (for example, regularly) using the infrared sensor 42. For example, when the inspection is performed while moving the infrared sensor 42 attached to a remote-controllable flying object, it is also possible to monitor places where people are hard to work.

Further, a strength of the coating film 20 may be adjusted by adjusting a component of the coating material and the structure of the ceramic particle 22 such that a defect easily occurs on the coating film 20 more than on the surface of the object 10. Thus, it is possible to detect a sign of the object 10 in practice, before cracking or the like due to a load such as a tensile stress, a compressive stress, or a strain occurs.

Ceramics have characteristics that emissivity is small in a specific wavelength region. However, since the ceramics also have transparency, there was a problem that the radiation of a material present on a back side of the ceramics is transmitted. The ceramic particle 22 included in the coating material according to the present example embodiment has a characteristic that emissivity or transmittance of light at a specific wavelength of an infrared band is small. Specifically, a porosity of the ceramic particle 22 is equal to or greater than 20%. Accordingly, infrared rays can be scattered before the light is transmitted. Therefore, the infrared ray transmission is small. Therefore, a surface coated with the coating material has less emission of the infrared rays at a specific wavelength.

The ceramic particle 22 has a pore and a dense portion. The dense portion includes a sintered body of ceramic crystals, and the pore is formed in a gap of the ceramic crystals. That is, it can be said that the ceramic particle 22 is a polycrystalline sintered body. For example, the pore includes a part that is connected in an inside of the ceramic particle 22 but is not linearly continuous. A size of the pore of the ceramic particle 22 is not particularly limited. However, for example, a sectional area of the pore is equal to or less than 5 $\mu m^2$. The sectional area of the pore can be confirmed, for example, by observing a section of the ceramic particle 22 with an electron microscope.

An example of a thermal radiation characteristic of the coating film 20 will be described below. For example, in the present example embodiment, the maximum value of a radiation intensity of the coating film 20 in a wavelength region of equal to or greater than 800 nm and equal to or less than 1100 nm is equal to or greater than twice a radiation intensity in a region on a wavelength side greater than 1100 nm, and more preferably equal to or greater than 3 times. Here, a temperature at which the radiation intensity is measured is not particularly limited, and there is no need to have such wavelength selectivity in the entire temperature range. The thermal radiation characteristic of the coating film 20 may have the wavelength selectivity under at least one temperature condition. However, the temperature at which the radiation intensity is measured in the wavelength region of equal to or greater than 800 nm and equal to or less than 1100 nm and the temperature at which the radiation intensity is measured in a region on a wavelength side greater than 1100 nm are set to be the same as each other.

Here, the wavelength region on the wavelength side greater than 1100 nm is, for example, a wavelength region of greater than 1100 nm and equal to or less than 1700 nm. In addition, the expression "the maximum value of a radiation intensity in a wavelength region of equal to or greater than 800 nm and equal to or less than 1100 nm is equal to or greater than twice a radiation intensity in a region on a wavelength side greater than 1100 nm" means, for example, that the maximum value of the radiation intensity in the wavelength region of equal to or greater than 800 nm and equal to or less than 1100 nm is equal to or greater than twice the maximum value of the radiation intensity in the region on a wavelength side greater than 1100 nm.

As described above, the ceramic particle 22 includes a compound represented by a compositional formula of any of $A_aR_bAl_cO_4$, $A_aR_bGa_cO_4$, $R_xAl_yO_{12}$, and $R_xGa_yO_{12}$. This compound is, for example, a crystal. In particular, it is preferable that the main component of the ceramic particle 22 is a crystal represented by the composition. For example, it is preferable that, in the ceramic particle 22, a content rate of the crystal represented by the compositional formula of any of $A_aR_bAl_cO_4$, $A_aR_bGa_cO_4$, $R_xAl_yO_{12}$, and $R_xGa_yO_{12}$ is equal to or greater than 75% by weight. Here, A is one or more elements selected from a group consisting of Ca, Sr, and Ba, and R is one or more elements selected from a group consisting of rare earth elements. Among these, R can be, for example, a lanthanoid. The lanthanoid is, for example, one or more selected from a group consisting of Pr, Nd, Sm, Eu, Tb, Dy, Ho, Er, Tm, and Yb. Radiation of lanthanoid ions can be used, for example, for calibrating a sensor or a camera. In addition, when using Yb of the lanthanoid as R, radiation in other near-infrared regions can be reduced while showing radiation of $Yb^{3+}$ ions.

The crystal represented by the composition of $A_aR_bAl_cO_4$ or $A_aR_bGa_cO_4$ has, for example, a $K_2NiF_4$ structure. In addition, the crystal represented by the composition of $R_xAl_yO_{12}$ or $R_xGa_yO_{12}$ has, for example, a garnet structure. The composition and the structure of the crystal contained in the ceramic particle 22 can be confirmed by, for example, X-ray diffraction method.

As described above, the porosity of the ceramic particle 22 is equal to or greater than 20% and equal to or less than 40%. When setting the porosity of the ceramic particle 22 to equal to or greater than 20%, the emission of the infrared ray due to the transmission of radiation from the object 10 can be sufficiently reduced. In addition, when setting the porosity of the ceramic particle 22 to equal to or less than 40%, it is possible to maintain the strength of the ceramic particle 22 in the coating material and to maintain the radiation of $R^{3+}$. The porosity of the ceramic particle 22 is more preferably equal to or less than 35%. On the other hand, from the viewpoints that a defect easily occurs in the coating film 20 and it is easy to detect the sign of damage of the object 10, the porosity of the ceramic particle 22 is more preferably equal to or greater than 25%, and still more preferably equal to or greater than 30%.

The "porosity" of the ceramic particle 22 is a ratio of the total volume of the gap existing in the ceramic particle 22 to the total volume of the ceramic particle 22. The porosity is calculated using the following expression.

Porosity=1−(Actual density of ceramic/Theoretical density of ceramic)

Here, measurement of the porosity of the ceramic particle 22 can be performed, for example, as follows.

First, a resin is applied to the surface of the ceramic particle 22 and dried, and a weight in the air is measured. Next, the ceramic particle 22 to which the resin applied is placed in a liquid and a weight in the liquid is measured. Using these, the actual density of the ceramic particle 22 is measured.

In addition, the theoretical density is obtained from the weight, a crystal structure, and a volume of the ceramic particle 22 by calculation. The theoretical density of the ceramic particle 22 is a theoretical density in a case of assuming that there is no pore in the ceramic particle 22. Using the actual density and the theoretical density, the porosity of the ceramic particle 22 can be obtained.

In this measurement, when applying a resin to the surface of the ceramic particle 22, it is possible to prevent liquid from entering the pore. The type of resin to be applied to the surface of the ceramic particle 22 is not particularly limited. However, since it is applied to the surface, it is preferable that the resin has a low specific gravity and high viscosity. In addition, it is preferable not to react with the liquid used in the Archimedes method. As the resin, for example, an acrylic resin or a cellulose resin can be used.

The ceramic particle 22 can be manufactured, for example, as follows. A plurality of materials containing an element contained in the ceramic particle 22, for example, oxides are prepared and weighed in a stoichiometric ratio to obtain a crystal of any of the composition formulas. However, from the viewpoint of stability in the air, a carbonate is preferably used as a material containing an element of alkaline earth metal. Since the carbonate of the alkaline earth metal may be weighed based on the stoichiometric ratio of the alkaline earth metal, since it changes into an oxide at the time of firing in the air.

Then, the materials are mixed and fired to obtain a polycrystal. Thereafter, the polycrystal is ground to obtain a primary particle. Further, the primary particle is press formed, for example, fired again (sintered) to obtain a pellet. The pellet is coarsely crushed to obtain the ceramic particle 22.

It is preferable that the primary particle obtained by grinding the polycrystal has a large particle size. In this manner, a gap is easily formed between the primary particles, and a large pore can be formed. In addition, a defect can easily occur in the coating film 20, it becomes easy to detect a sign of damage of the object 10.

In addition, it is preferable that the primary particles have a large particle size variation. When including particles having small particle sizes, the primary particles are easily connected to each other. Therefore, the sintering becomes easier. On the other hand, in a case where the particle size variation of the primary particles is small and the particle sizes are large, sintering at high temperature or for a long time is required. In consideration of a balance between the porosity and the sintering time, it is preferable that a proportion of particles having a large particle size is greater than the proportion of particles having a small particle size.

In addition, the porosity of the ceramic particles 22 can be adjusted by adjusting, for example, the particle size of the primary particles, the pressure in press forming, the firing temperature at the time of pellet formation, and the like. For example, in a case where the compound contained in the ceramic particle 22 is represented by the compositional formula $A_aR_bAl_cO_4$, the sintering temperature at the time of pellet formation is preferably equal to or greater than 1350° C. and equal to or less than 1400° C. In addition, in a case where the compound contained in the ceramic particle 22 is represented by the compositional formula $A_aR_bGa_cO_4$, the sintering temperature at the time of pellet formation is preferably equal to or greater than 1250° C. and equal to or less than 1300° C. When setting the sintering temperature to equal to or greater than the lower limit, sintering time can be kept short and costs can be reduced. When setting the sintering temperature to equal to or less than the upper limit, a sintered body having suitable porosity can be stably obtained without lowering of the porosity or melting of the fired body.

The particle size of the ceramic particle 22 is not particularly limited. However, it is preferable that the maximum peak in a particle size distribution curve of the ceramic particles 22 is located within a range of equal to or greater than 5 μm and equal to or less than 100 μm. According to this, the ceramic particles 22 are more easily uniformly fixed to the object 10, and a defect is more likely to occur in the coating film 20. Thus, it is possible to easily detect the sign of damage of the object 10. The maximum peak in the particle size distribution curve of the ceramic particles 22 is more preferably located within the range of equal to or greater than 10 μm and equal to or less than 60 μm, and more preferably located within the range of equal to or greater than 20 μm and equal to or less than 50 μm.

In addition, it is preferable that a content rate of the ceramic particle 22 relative to the coating film 20 of the coating material is equal to or greater than 75% by weight and equal to or less than 92% by weight. According to this, the ceramic particles 22 are sufficiently combined with each other by the binder 24, and the infrared ray from the object 10 can be sufficiently shielded by the ceramic particles 22. The content rate of the ceramic particle 22 relative to the coating film 20 of the coating material can be determined, for example, by heating the coating film 20 of the coating material at a high temperature, incinerating components such as binder 24, and then calculating the weight ratio before and after the incinerating.

The binder 24 bonds the ceramic particles 22 to each other in the coating film 20 of the coating material. For example, the binder 24 includes a resin. In order to maintain low emissivity and transmittance of light in the infrared band of the ceramic particle 22, in the coating material and the coating film 20 of the coating material, it is preferable that the binder 24 does not enter the pore of the ceramic particle 22. However, a state of the binder 24 is not particularly limited. The binder 24 may enter at least a part of the pore of the ceramic particle 22 in at least one of the coating material and the coating film 20 of the coating material. In addition, a refractive index of the binder 24 is preferably equal to or greater than 1.0 and equal to or less than 1.4. If the refractive index of the binder 24 is equal to or greater than 1.0 and equal to or less than 1.4, even in a case where the binder 24 enters the pore, an influence on the light transmission suppression effect of the ceramic particle 22 in an infrared band is small.

Examples of the binder 24 include a fluorine resin. Among them, it is preferable that the binder 24 contains an amorphous fluororesin. It is more preferable that the binder 24 is the amorphous fluororesin. According to this, the refractive index of the binder 24 can be lowered.

The light absorptance of the binder 24 is preferably equal to or less than 0.1, in the wavelength range of equal to or greater than 1200 nm and equal to or less than 1700 nm. Since the absorptance is equal to the emissivity of a substance, when setting the absorptance in the wavelength range of equal to or greater than 1200 nm and equal to or less than 1700 nm to equal to or less than 0.1, the emissivity of the infrared ray of the binder 24 can be lowered. As a result, the radiation of the infrared ray of the coating film 20 can be reduced.

The coating material may also contain a pigment, a solvent, a plasticizer, a dispersing agent, a thickener, and other additives, in addition to the ceramic particles 22 and the binder 24. The total content of these additives is, for example, equal to or less than 5% by weight relative to the coating film 20 of the coating material.

The coating material can be obtained by mixing the ceramic particle 22 and the binder 24, and as needed, other components.

The coating material can be used by being applied to the surface of the object 10. The object 10 is covered with the coating film 20 of the coating material by solidifying or curing of the binder 24. In this manner, for example, in an infrared ray detection image obtained by imaging the object 10, a crack or the like of the coating film 20 can be easily discovered. Further, it is possible to discover damage of the object 10 at an early stage or detect the sign of damage of the object 10.

From the viewpoint of suppressing transmission of the infrared ray from the object 10, the thickness of the coating film 20 is preferably equal to or greater than 50 μm, and more preferably equal to or greater than 100 μm. On the other hand, the thickness of the coating film 20 is preferably equal to or less than 500 μm, and more preferably equal to or less than 200 μm. According to this, a defect can easily occur in the coating film 20, and it becomes easy to detect a sign of damage of the object 10.

Figure 4:
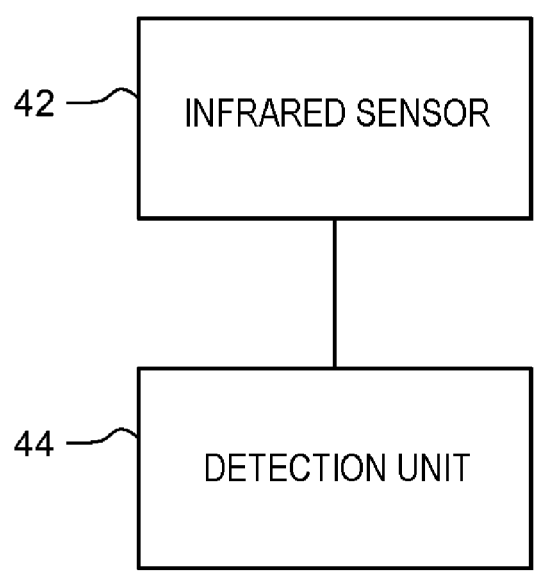
FIG. 4 is a block diagram showing an example of a functional configuration of a monitoring system according to an example embodiment.

FIG. 4 is a block diagram showing an example of a functional configuration of the monitoring system 40 according to the present example embodiment. The monitoring method of the present example embodiment is realized, for example, by the following monitoring system 40. The monitoring system 40 includes the infrared sensor 42 and the detection unit 44. The infrared sensor 42 detects an infrared ray radiated from the region of a surface of an object 10 to which the coating film 20 of the coating material is provided. The detection unit 44 analyzes the detection result of the infrared sensor 42 to detect deterioration of the coating film 20. As described above, the coating film 20 includes the porous ceramic particle 22 and the binder 24, and the ceramic particle 22 includes a compound represented by a compositional formula of any of $A_aR_bAl_cO_4$, $A_aR_bGa_cO_4$, $R_xAl_yO_{12}$, and $R_xGa_yO_{12}$. Here, A is one or more elements selected from a group consisting of Ca, Sr, and Ba, and R is one or more elements selected from a group consisting of rare earth elements. Also, a is equal to or greater than 0.9 and equal to or less than 1.1, b is equal to or greater than 0.9 and equal to or less than 1.1, c is equal to or greater than 0.9 and equal to or less than 1.1, x is equal to or greater than 2.9 and equal to or less than 3.1, and y is equal to or greater than 4.9 and equal to or less than 5.1. A porosity of the ceramic particle 22 is equal to or greater than 20% and equal to or less than 40%. Hereinafter, a description will be given in detail.

The coating film 20 is formed in advance in at least a part of a region to be inspected. In a case where the infrared sensor 42 is an infrared ray camera, the infrared sensor 42 outputs image data as a detection result. In this image, contrast according to the detected infrared intensity is shown.

Figure 5:
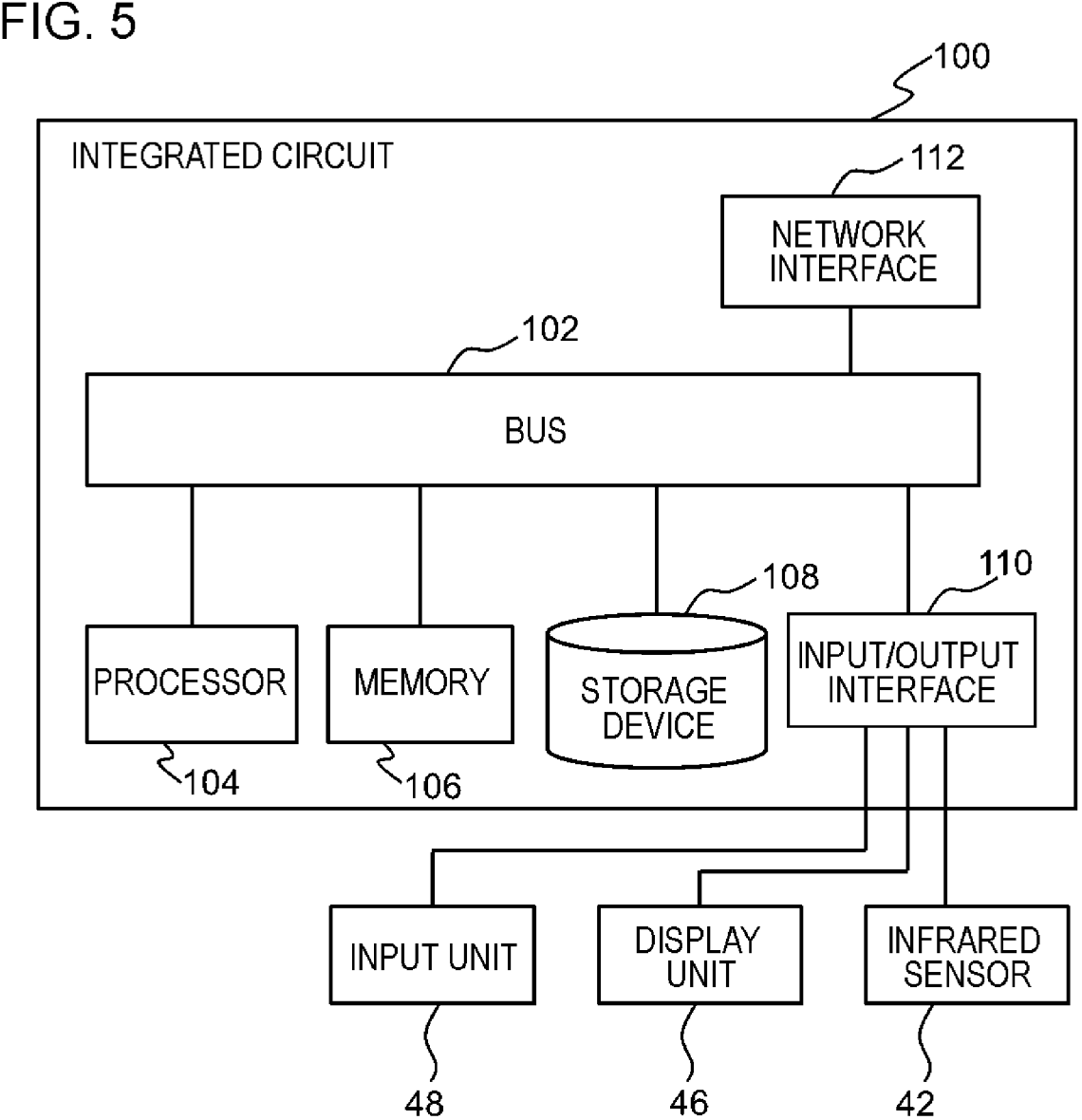
FIG. 5 is a diagram showing an example of a hardware configuration of the monitoring system according to the example embodiment.

FIG. 5 is a diagram showing an example of a hardware configuration of the monitoring system 40. In this drawing, the detection unit 44 is mounted using an integrated circuit 100. The integrated circuit 100 is, for example, a system on chip (SoC).

The integrated circuit 100 includes a bus 102, a processor 104, a memory 106, a storage device 108, an input/output interface 110, and a network interface 112. The bus 102 is a data transmission path through which the processor 104, the memory 106, the storage device 108, the input/output interface 110, and the network interface 112 mutually transmit and receive the data. However, a method of connecting the processor 104 and the like to each other is not limited to a bus connection. The processor 104 is an arithmetic processing device realized by using a microprocessor or the like. The memory 106 is a memory realized by using a random access memory (RAM) or the like. The storage device 108 is a storage device realized by using a read only memory (ROM), a flash memory, or the like.

The input/output interface 110 is an interface to connect the integrated circuit 100 to a peripheral device. In the drawing, the infrared sensor 42, a display unit 46, and an input unit 48 are connected to the input/output interface 110. The display unit 46 is, for example, a monitor that displays a processing result of the detection unit 44, and the input unit 48 is an input device that instructs, for example, the detection unit 44 to perform processing.

The network interface 112 is an interface that connects the integrated circuit 100 to a communication network. The communication network is, for example, a controller area network (CAN) communication network. A method of connecting the network interface 112 to the communication network may be a wireless connection or wire connection.

The storage device 108 stores a program module for realizing a function of the detection unit 44. The processor 104 reads the program module into the memory 106 and executes the program to realize the function of the detection unit 44.

A hardware configuration of the integrated circuit 100 is not limited to the configuration shown in the drawing. For example, the program module may be stored in the memory 106. In this case, the integrated circuit 100 may not have the storage device 108.

Return to FIG. 4, an operation of the monitoring system 40 will be described below. In the monitoring system 40, the infrared sensor 42 may be a fixed camera or a movable camera capable of changing a region to be imaged.

The detection unit 44 detects deterioration of the coating film 20 and monitors the presence or absence of the deterioration of the object 10, by acquiring image data from the infrared sensor 42 to perform processing. An example of a method of detecting the deterioration of the coating film 20 by the detection unit 44 will be described below.

Figure 6:
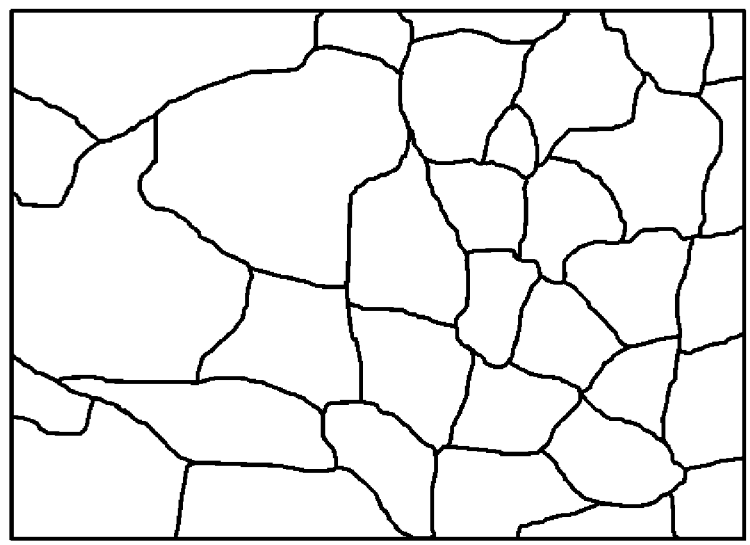
FIG. 6 is a diagram showing an example of an image obtained by an infrared sensor.

FIG. 6 is a diagram showing an example of an image obtained by the infrared sensor 42. In the drawing, a portion where the detected intensity is high is represented by black and a portion where the detected intensity is low is represented by white. For example, in the region where the coating film 20 is formed, radiation or transmission of the infrared ray is small, and thus this region is displayed in white in the image. On the other hand, when cracks occur in the coating film 20, gaps can be formed in the coating film 20 as shown in the drawing, and transmission of the infrared ray from the object 10 becomes large. Therefore, the infrared rays are detected with high intensity and displayed in black.

For example, specifically, the detection unit 44 binarizes the image acquired from the infrared sensor 42. Then, a region having a high infrared intensity in the binarized image is extracted as a region where the coating film 20 is not formed. Here, since the detected intensity of the infrared ray in the region where the coating film 20 is formed is particularly small, the region where the coating film 20 is formed and the region where the coating film is not formed can be separated with low noise.

Further, the detection unit 44 calculates, from the image, the area of the extracted region where the coating film 20 is not formed, and determines that deterioration occurs in the object 10 if the calculated area is greater than the predetermined reference area. Information indicating the reference area is stored, for example, in the storage device 108 in advance, and this information can be read out and used by the detection unit 44. A case where deterioration occurs in the object 10 may include a case where a defect such as cracking or breaking has already occurred in the object 10 and a case where a defect does not yet occur in the object 10 but a defect is expected to occur soon. In addition, the detection unit 44 may perform pattern matching on the image to detect cracking or peeling.

In addition, the detection unit 44 may determine the type of load applied to the object 10, based on the shape pattern of the region where the coating film 20 is not formed. For example, matching processing is performed on the binarized image with a pattern stored in advance in the storage device 108. Specifically, for example, the detection unit 44 determines that shear stress or tensile stress is applied to the object 10 if the region where the coating film 20 is not formed includes a plurality of linear regions in approximately parallel directions, and the detection unit 44 can determine that a compressive stress is applied to the object 10 if the region where the coating film 20 is not formed includes a planar region, that is, a region where the coating film 20 is peeled off.

In addition, the monitoring method according to the present example embodiment is realized by using the following structure 10a, construction 10b, or movable body 10c. The structure 10a, the construction 10b, or the movable body 10c has a coating film 20 of a coating material on at least a part of a surface thereof. As described above, the coating film 20 includes a porous ceramic particle 22 and the binder 24, and the ceramic particle 22 includes a compound represented by a compositional formula of any of $A_aR_b$ $Al_cO_4$, $A_aR_bGa_cO_4$, $R_xAl_yO_{12}$, and $R_xGa_yO_{12}$. Here, A is one or more elements selected from a group consisting of Ca, Sr, and Ba, and R is one or more elements selected from a group consisting of rare earth elements. Also, a is equal to or greater than 0.9 and equal to or less than 1.1, b is equal to or greater than 0.9 and equal to or less than 1.1, c is equal to or greater than 0.9 and equal to or less than 1.1, x is equal to or greater than 2.9 and equal to or less than 3.1, and y is equal to or greater than 4.9 and equal to or less than 5.1. The porosity of the ceramic particle 22 is equal to or greater than 20% and equal to or less than 40%.

Next, an operation and an effect of the present example embodiment will be described. According to the monitoring method according to the present example embodiment, the ceramic particle 22 emits less infrared rays. In addition, the infrared ray from the object 10 can also be obstructed by scattering (reflection) of the ceramic particle 22. Therefore, the infrared ray emission from the surface of the coating film 20 decreases. Then, such coating film 20 is formed in advance on the object 10 and detection is performed by an infrared sensor or an infrared ray camera. Accordingly, the deterioration of the object 10 can be easily detected.

EXAMPLE

Hereinafter, the present example embodiment will be described with reference to Examples below in detail. The present example embodiment is not limited to the description of these Examples.

Figure 7:
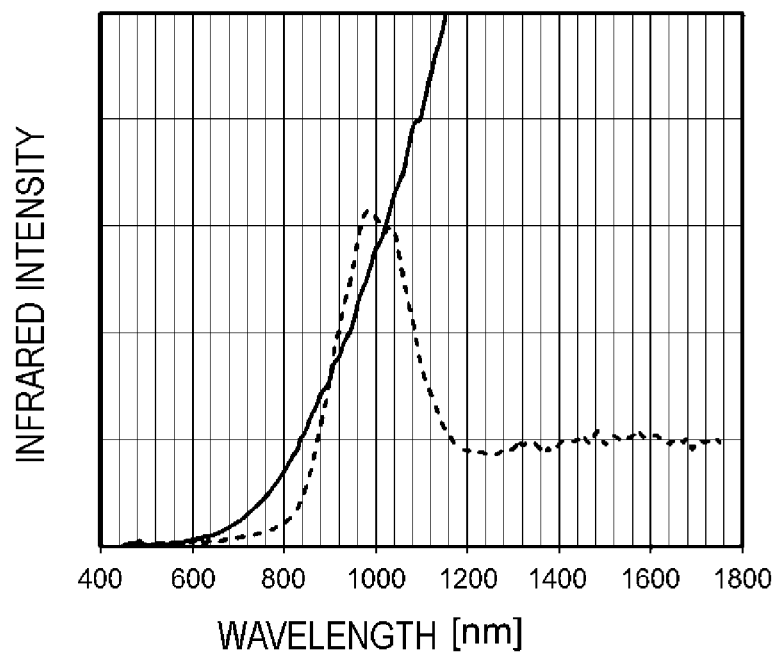
FIG. 7 is a graph showing a radiation characteristic of a $Yb_3Al_5O_{12}$ pellet according to Example.

FIG. 7 is a graph showing a radiation characteristic of a $Yb_3Al_5O_{12}$ pellet according to Example. In the drawing, the radiation intensity from the surface of SiC ceramics at 1107° C. is indicated by a solid line and the radiation intensity from the surface of $Yb_3Al_5O_{12}$ pellet at 1070° C. is indicated by a broken line. The SiC ceramics is a gray body with an emissivity of approximately 0.9. The $Yb_3Al_5O_{12}$ pellet is a polycrystalline sintered body of a crystal represented by the compositional formula of $Yb_3Al_5O_{12}$ and is formed in a shape of a pellet. For measurement of the $Yb_3Al_5O_{12}$ pellet, SiC ceramics as a heat source was installed on a back side of the pellet and measurement was performed. In the drawing, a component which is radiated from the SiC and transmitted through the pellet is also shown as being radiated from the pellet.

Figure 8:
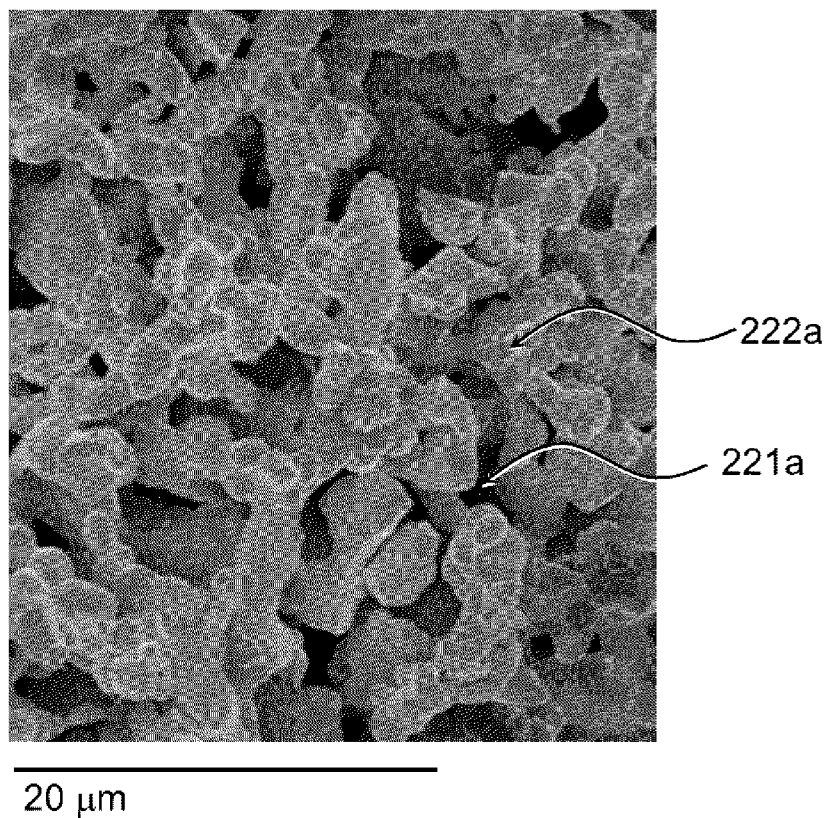
FIG. 8 is a view showing a result of observation of a surface of the $Yb_3Al_5O_{12}$ pellet by a scanning electron microscope.

FIG. 8 is a view showing a result of observation of a surface of the $Yb_3Al_5O_{12}$ pellet by a scanning electron microscope. From the drawing, it can be seen that the pellet has a dense portion 222a formed of primary particles and a pore 221a.

As can be seen from FIG. 7, each spectrum has a peak corresponding to $^2F_{5/2} \rightarrow {}^2F_{7/2}$ transition of 4f electron of $Yb^{3+}$ in a wavelength range of equal to or greater than 800 nm and equal to or less than 1200 nm. The emissivity of the wavelength band of equal to or greater than 1200 nm and equal to or less than 1700 nm is particularly low. As long as the porosity is maintained, there is no limitation to the pellet, and even in a particulate polycrystal, the same characteristics are exhibited.

This pellet was ground to obtain ceramic particles and mixed with a binder to prepare a coating material as described in the example embodiment. The porosity of the ceramic particle is within a range of equal to or greater than 20% and equal to or less than 40%. This coating material was applied to a base material and photographed with an infrared ray camera. As a result, the detected infrared intensity was less than that of a case where the coating material was not applied.

Hereinabove, although the example embodiment of the present invention has been described with reference to the drawings, these are examples of the present invention, and various configurations other than the above can be adopted.

A part or all of the example embodiment may also be described as in the following appendices, but are not limited to the following.

1-1. A monitoring method comprising:
detecting, by an infrared sensor, an infrared ray radiated from a region of a surface of an object to which a coating film of a coating material is provided,
wherein the coating film comprises a porous ceramic particle and a binder, the ceramic particle comprises a compound represented by a compositional formula of any of $A_aR_bAl_cO_4$, $A_aR_bGa_cO_4$, $R_xAl_yO_{12}$, and $R_xGa_yO_{12}$, where A is one or more elements selected from a group consisting of Ca, Sr, and Ba, R is one or more elements selected from a group consisting of rare earth elements, a is equal to or greater than 0.9 and equal to or less than 1.1, b is equal to or greater than 0.9 and equal to or less than 1.1, c is equal to or greater than 0.9 and equal to or less than 1.1, x is equal to or greater than 2.9 and equal to or less than 3.1, and y is equal to or greater than 4.9 and equal to or less than 5.1, and a porosity of the ceramic particle is equal to or greater than 20% and equal to or less than 40%.

1-2. The monitoring method according to 1-1,
wherein a thickness of the coating film is equal to or less than 200 μm.

1-3. The monitoring method according to 1-1 or 1-2,
wherein a maximum peak in a particle size distribution curve of the ceramic particles is located within a range of equal to or greater than 5 μm and equal to or less than 100 μm.

1-4. The monitoring method according to any one of 1-1 to 1-3,
wherein porosity of the ceramic particle is equal to or greater than 30%.

1-5. The monitoring method according to any one of 1-1 to 1-4,
wherein a content rate of the ceramic particle relative to the coating film is equal to or greater than 75% by weight and equal to or less than 92% by weight.

1-6. The monitoring method according to any one of 1-1 to 1-5,
wherein a refractive index of the binder is equal to or greater than 1.0 and equal to or less than 1.4.

1-7. The monitoring method according to any one of 1-1 to 1-6,
wherein a light absorptance of the binder is equal to or less than 0.1 in a wavelength range of equal to or greater than 1200 nm and equal to or less than 1700 nm.

1-8. The monitoring method according to any one of 1-1 to 1-7,
wherein the binder comprises a resin.

1-9. The monitoring method according to 1-8,
wherein the binder comprises an amorphous fluororesin.

1-10. The monitoring method according to any one of 1-1 to 1-9,
wherein the ceramic particle is a polycrystalline sintered body.

1-11. The monitoring method according to any one of 1-1 to 1-10,
wherein the object is a structure, a construction, or a movable body.

2-1. A monitoring system comprising:
an infrared sensor that detects an infrared ray radiated from a region of a surface of an object to which a coating film of a coating material is provided; and
a detection unit that analyzes a detection result of the infrared sensor to detect deterioration of the coating film,
wherein the coating film comprises a porous ceramic particle and a binder,
the ceramic particle comprises a compound represented by a compositional formula of any of $A_aR_bAl_cO_4$, $A_aR_bGa_cO_4$, $R_xAl_yO_{12}$, and $R_xGa_yO_{12}$, where A is one or more elements selected from a group consisting of Ca, Sr, and Ba, R is one or more elements selected from a group consisting of rare earth elements, a is equal to or greater than 0.9 and equal to or less than 1.1, b is equal to or greater than 0.9 and equal to or less than 1.1, c is equal to or greater than 0.9 and equal to or less than 1.1, x is equal to or greater than 2.9 and equal to or less than 3.1, and y is equal to or greater than 4.9 and equal to or less than 5.1, and
a porosity of the ceramic particle is equal to or greater than 20% and equal to or less than 40%.

2-2. The monitoring system according to 2-1,
wherein a thickness of the coating film is equal to or less than 200 μm.

2-3. The monitoring system according to 2-1 or 2-2,
wherein a maximum peak in a particle size distribution curve of the ceramic particles is located within a range of equal to or greater than 5 μm and equal to or less than 100 μm.

2-4. The monitoring system according to any one of 2-1 to 2-3,
wherein porosity of the ceramic particle is equal to or greater than 30%.

2-5. The monitoring system according to any one of 2-1 to 2-4,
wherein a content rate of the ceramic particle relative to the coating film is equal to or greater than 75% by weight and equal to or less than 92% by weight.

2-6. The monitoring system according to any one of 2-1 to 2-5,
wherein a refractive index of the binder is equal to or greater than 1.0 and equal to or less than 1.4.

2-7. The monitoring system according to any one of 2-1 to 2-6,
wherein a light absorptance of the binder is equal to or less than 0.1 in a wavelength range of equal to or greater than 1200 nm and equal to or less than 1700 nm.

2-8. The monitoring system according to any one of 2-1 to 2-7,
wherein the binder comprises a resin.

2-9. The monitoring system according to 2-8,
wherein the binder comprises an amorphous fluororesin.

2-10. The monitoring system according to any one of 2-1 to 2-9,
wherein the ceramic particle is a polycrystalline sintered body.

2-11. The monitoring system according to any one of 2-1 to 2-10,
wherein the object is a structure, a construction, or a movable body.

3-1. A structure, a construction, or a movable body comprising:
a coating film of a coating material on at least a part of a surface,
wherein the coating film comprises a porous ceramic particle and a binder,
the ceramic particle comprises a compound represented by a compositional formula of any of $A_aR_bAl_cO_4$, $A_aR_bGa_cO_4$, $R_xAl_yO_{12}$, and $R_xGa_yO_{12}$, where A is one or more elements selected from a group consisting of Ca, Sr, and Ba, R is one or more elements selected from a group consisting of rare earth elements, a is equal to or greater than 0.9 and equal to or less than 1.1, b is equal to or greater than 0.9 and equal to or less than 1.1, c is equal to or greater than 0.9 and equal to or less than 1.1, x is equal to or greater than 2.9 and equal to or less than 3.1, and y is equal to or greater than 4.9 and equal to or less than 5.1, and
a porosity of the ceramic particle is equal to or greater than 20% and equal to or less than 40%.

3-2. The structure, the construction, or the movable body according to 3-1,
wherein a thickness of the coating film is equal to or less than 200 μm.

3-3. The structure, the construction, or the movable body according to 3-1 or 3-2,
wherein a maximum peak in a particle size distribution curve of the ceramic particles is located within a range of equal to or greater than 5 μm and equal to or less than 100 μm.

3-4. The structure, the construction, or the movable body according to any one of 3-1 to 3-3,
wherein porosity of the ceramic particle is equal to or greater than 30%.

3-5. The structure, the construction, or the movable body according to any one of 3-1 to 3-4,
wherein a content rate of the ceramic particle relative to the coating film is equal to or greater than 75% by weight and equal to or less than 92% by weight.

3-6. The structure, the construction, or the movable body according to any one of 3-1 to 3-5,
wherein a refractive index of the binder is equal to or greater than 1.0 and equal to or less than 1.4.

3-7. The structure, the construction, or the movable body according to any one of 3-1 to 3-6,
wherein a light absorptance of the binder is equal to or less than 0.1 in a wavelength range of equal to or greater than 1200 nm and equal to or less than 1700 nm.

3-8. The structure, the construction, or the movable body according to any one of 3-1 to 3-7,
wherein the binder comprises a resin.

3-9. The structure, the construction, or the movable body according to 3-8,
wherein the binder comprises an amorphous fluororesin.

3-10. The structure, the construction, or the movable body according to any one of 3-1 to 3-9,
wherein the ceramic particle is a polycrystalline sintered body.

This application claims priority to Japanese Patent Application No. 2016-237665 filed on Dec. 7, 2016, the content of which is incorporated herein in its entirety.

The invention claimed is:

1. A monitoring method comprising:
detecting, by an infrared sensor, an infrared ray radiated from a region of a surface of an object to which a coating film of a coating material is provided,
wherein the coating film comprises a porous ceramic particle and a binder,
the ceramic particle comprises a compound represented by a compositional formula of any of $A_aR_bAl_cO_4$, $A_aR_bGa_cO_4$, $R_xAl_yO_{12}$, and $R_xGa_yO_{12}$, where A is one or more elements selected from a group consisting of Ca, Sr, and Ba, R is one or more elements selected from a group consisting of rare earth elements, a is equal to or greater than 0.9 and equal to or less than 1.1, b is equal to or greater than 0.9 and equal to or less than 1.1, c is equal to or greater than 0.9 and equal to or less than 1.1, x is equal to or greater than 2.9 and equal to or less than 3.1, and y is equal to or greater than 4.9 and equal to or less than 5.1, and
a porosity of the ceramic particle is equal to or greater than 20% and equal to or less than 40%.

2. The monitoring method according to claim 1,
wherein a thickness of the coating film is equal to or less than 200 μm.

3. The monitoring method according to claim 1,
wherein a maximum peak in a particle size distribution curve of the ceramic particles is located within a range of equal to or greater than 5 μm and equal to or less than 100 μm.

4. The monitoring method according to claim 1,
wherein the porosity of the ceramic particle is equal to or greater than 30%.

5. The monitoring method according to claim 1,
wherein a content rate of the ceramic particle relative to the coating film is equal to or greater than 75% by weight and equal to or less than 92% by weight.

6. The monitoring method according to claim 1, wherein a refractive index of the binder is equal to or greater than 1.0 and equal to or less than 1.4.

7. The monitoring method according to claim 1, wherein a light absorptance of the binder is equal to or less than 0.1 in a wavelength range of equal to or greater than 1200 nm and equal to or less than 1700 nm.

8. The monitoring method according to claim 1, wherein the binder comprises an amorphous fluororesin.

9. The monitoring method according to claim 1, wherein the ceramic particle is a polycrystalline sintered body.

10. The monitoring method according to claim 1, wherein the object is a structure, a construction, or a movable body.

11. The monitoring method according to claim 1, wherein a detection unit analyzes a detection result of the infrared sensor to detect deterioration of the coating film.

12. The monitoring method according to claim 11, wherein the detection unit analyzes the detection result of the infrared sensor to calculate an area of a region where the coating film is not formed, and determine presence or absence of the deterioration of the coating film based on the calculated area.

13. The monitoring method according to claim 12, wherein the detection unit binarizes an image obtained by the infrared sensor, and calculates, based on the binarized image, the area of the region where the coating film is not formed.

14. The monitoring method according to claim 1, wherein a detection unit analyzes a detection result of the infrared sensor to determine a type of load applied to the object.

15. The monitoring method according to claim 14, wherein the detection unit analyzes the detection result of the infrared sensor to extract a shape pattern of a region where the coating film is not formed, and determines a type of the load based on the extracted shape pattern.

16. The monitoring method according to claim 15, wherein the detection unit binarizes an image obtained by the infrared sensor and extracts, based on the binarized image, the shape pattern of the region where the coating film is not formed.

17. A monitoring system comprising:
an infrared sensor that detects an infrared ray radiated from a region of a surface of an object to which a coating film of a coating material is provided, wherein the coating film comprises a porous ceramic particle and a binder,
the ceramic particle comprises a compound represented by a compositional formula of any of $A_aR_bAl_cO_4$, $A_aR_bGa_cO_4$, $R_xAl_yO_{12}$, and $R_xGa_yO_{12}$, where A is one or more elements selected from a group consisting of Ca, Sr, and Ba, R is one or more elements selected from a group consisting of rare earth elements, a is equal to or greater than 0.9 and equal to or less than 1.1, b is equal to or greater than 0.9 and equal to or less than 1.1, c is equal to or greater than 0.9 and equal to or less than 1.1, x is equal to or greater than 2.9 and equal to or less than 3.1, and y is equal to or greater than 4.9 and equal to or less than 5.1, and
a porosity of the ceramic particle is equal to or greater than 20% and equal to or less than 40%.

18. The monitoring system according to claim 17, further comprising:
a detection unit that analyzes a detection result of the infrared sensor to detect deterioration of the coating film.

19. The monitoring system according to claim 17, further comprising:
a detection unit that analyzes a detection result of the infrared sensor to determine a type of a load applied to the object.

20. A structure, a construction, or a movable body comprising:
a coating film of a coating material on at least a part of a surface,
wherein the coating film comprises a porous ceramic particle and a binder,
the ceramic particle comprises a compound represented by a compositional formula of any of $A_aR_bAl_cO_4$, $A_aR_bGa_cO_4$, $R_xAl_yO_{12}$, and $R_xGa_yO_{12}$, where A is one or more elements selected from a group consisting of Ca, Sr, and Ba, R is one or more elements selected from a group consisting of rare earth elements, a is equal to or greater than 0.9 and equal to or less than 1.1, b is equal to or greater than 0.9 and equal to or less than 1.1, c is equal to or greater than 0.9 and equal to or less than 1.1, x is equal to or greater than 2.9 and equal to or less than 3.1, and y is equal to or greater than 4.9 and equal to or less than 5.1, and
a porosity of the ceramic particle is equal to or greater than 20% and equal to or less than 40%.

* * * * *